US008682697B1

(12) United States Patent (10) Patent No.: US 8,682,697 B1
Harris, Sr. (45) Date of Patent: Mar. 25, 2014

(54) SYSTEMS AND METHODS FOR GENERATING EDITS FOR HEALTHCARE TRANSACTIONS TO ADDRESS BILLING DISCREPANCIES

(75) Inventor: Patrick Harris, Sr., Atlanta, GA (US)

(73) Assignee: McKesson Financial Holdings (BM)

( * ) Notice: Subject to any disclaimer, the term of this patent is extended or adjusted under 35 U.S.C. 154(b) by 184 days.

(21) Appl. No.: 12/731,269

(22) Filed: Mar. 25, 2010

(51) Int. Cl.
    *G06Q 40/00* (2012.01)
(52) U.S. Cl.
    USPC .......................................................... 705/4
(58) Field of Classification Search
    USPC ....................................................... 705/2–4
    See application file for complete search history.

(56) References Cited

U.S. PATENT DOCUMENTS

| 5,628,530 | A | 5/1997 | Thornton |
| 6,012,035 | A | 1/2000 | Freeman et al. |
| 6,195,612 | B1 | 2/2001 | Pack-Harris |
| 6,757,898 | B1 | 6/2004 | Ilsen et al. |
| 6,769,228 | B1 | 8/2004 | Mahar |
| 7,155,397 | B2 | 12/2006 | Alexander et al. |
| 7,401,027 | B2 | 7/2008 | Moore et al. |
| 7,761,311 | B2 | 7/2010 | Clements et al. |
| 7,797,172 | B2 * | 9/2010 | Fitzgerald et al. ................. 705/4 |
| 8,244,556 | B1 | 8/2012 | Ringold |
| 8,489,411 | B1 | 7/2013 | Rowe et al. |
| 2001/0037216 | A1 | 11/2001 | Oscar et al. |
| 2002/0002495 | A1 | 1/2002 | Ullman |
| 2002/0087583 | A1 | 7/2002 | Morgan et al. |
| 2002/0111832 | A1 | 8/2002 | Judge |
| 2002/0188476 | A1 | 12/2002 | Bienvenu |
| 2002/0198831 | A1 | 12/2002 | Patricelli et al. |
| 2003/0009367 | A1 | 1/2003 | Morrison |
| 2003/0050799 | A1 | 3/2003 | Jay et al. |
| 2003/0069760 | A1 | 4/2003 | Gelber |
| 2003/0083903 | A1 * | 5/2003 | Myers ............................... 705/2 |
| 2003/0149625 | A1 | 8/2003 | Leonardi et al. |
| 2003/0154163 | A1 | 8/2003 | Phillips et al. |
| 2003/0229540 | A1 | 12/2003 | Algiene |
| 2004/0006490 | A1 | 1/2004 | Gingrich et al. |
| 2004/0039599 | A1 | 2/2004 | Fralic |
| 2004/0054685 | A1 | 3/2004 | Rahn et al. |
| 2004/0073457 | A1 | 4/2004 | Kalies |

(Continued)

FOREIGN PATENT DOCUMENTS

| CA | 2482370 A1 | 3/2006 |
| WO | WO9503569 A3 | 2/1995 |
| WO | WO0039737 A1 | 7/2000 |
| WO | WO2007025295 A2 | 3/2007 |

OTHER PUBLICATIONS

Non-final Office Action for U.S. Appl. No. 11/759,767 mailed Jun. 24, 2011.

(Continued)

*Primary Examiner* — Joseph Burgess
(74) *Attorney, Agent, or Firm* — Sutherland Asbill & Brennan LLP

(57) ABSTRACT

Systems and methods are provided for generating edits for healthcare transactions to address billing discrepancies. Information associated with an audit performed on a healthcare transaction may be received. Based at least in part on the received information, a billing discrepancy associated with the healthcare transaction may be identified. Based upon the identified billing discrepancy, a proposed edit may be generated that can be utilized to mitigate an impact of the identified billing discrepancy during the processing of one or more subsequent healthcare transactions.

15 Claims, 6 Drawing Sheets

(56) References Cited

U.S. PATENT DOCUMENTS

| | | |
|---|---|---|
| 2004/0078234 A1 | 4/2004 | Tallal, Jr. et al. |
| 2004/0117323 A1 | 6/2004 | Mindala |
| 2004/0148198 A1 | 7/2004 | Kalies |
| 2004/0249745 A1 | 12/2004 | Baaren |
| 2005/0015280 A1 | 1/2005 | Gabel et al. |
| 2005/0060201 A1 | 3/2005 | Connely, III et al. |
| 2005/0102169 A1 | 5/2005 | Wilson |
| 2005/0137912 A1* | 6/2005 | Rao et al. ............... 705/4 |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240473 A1 | 10/2005 | Ayers, Jr. et al. |
| 2005/0288972 A1 | 12/2005 | Marvin et al. |
| 2006/0020514 A1 | 1/2006 | Yered |
| 2006/0026041 A1 | 2/2006 | Ullman |
| 2006/0085230 A1 | 4/2006 | Brill et al. |
| 2006/0149784 A1 | 7/2006 | Tholl et al. |
| 2006/0184391 A1 | 8/2006 | Barre et al. |
| 2006/0212318 A1 | 9/2006 | Dooley et al. |
| 2006/0217824 A1 | 9/2006 | Allmon et al. |
| 2006/0259363 A1 | 11/2006 | Jhetam et al. |
| 2007/0005402 A1 | 1/2007 | Kennedy et al. |
| 2007/0050209 A1 | 3/2007 | Yered |
| 2007/0136100 A1 | 6/2007 | Daugherty et al. |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2008/0097903 A1 | 4/2008 | Boyle |

OTHER PUBLICATIONS

Sampson, R.J., Taking Control of Health Care Costs, Best's Review—Life Health Insurance Edition, Nov. 1983, pp. 64-66, vol. 84, Issue 7, USA.

Anonymous. ACS to Demonstrate Electronic Health Record Solution Suite at MMIS 2007 Conference; EHR Tools Consolidate Data. Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic; On-line Goes In-House, Chain Store Age Executive, Jan. 1987, pp. 128-132. vol. 63, Issue 1, USA.

Anonymous, TechRx Announces Successful Beta Deployment of T-Rex. PR Newswire, May 13, 2002.

Final Office Action for U.S. Appl. No. 11/759,767 mailed Dec. 24, 2009.

Non-Final Office Action for U.S. Appl. No. 11/759,767 mailed Jul. 9, 2009.

Navitus, "Pharmacy Adjudication Alternative to WAP" Pharmacy Benefits Academy, Aug. 19, 2010.

ViewPoints, "AWP Litigation Means Rapid Change Ahead" Nov./Dec. 2008.

State of Mississippi, Division of Medicaid, Provider Policy Manual May 12, 2008.

Paduda, Joseph, "Managed Care Matters" from comments, 2006.

Pennsylvania Department of Aging, "Acquisition Cost-Based Pricing for the PACE Program" Feb. 10, 2009.

Non-Final Office Action mailed Apr. 6, 2011 for related U.S. Appl. No. 12/415,134 (filed Mar. 31, 2009).

Non-final Office Action for U.S. Appl. No. 12/327,100 mailed May 11, 2011.

Final Office Action for U.S. Appl. No. 12/327,100 mailed Oct. 17, 2011.

Final Office Action for U.S. Appl. No. 11/759,767 mailed Dec. 6, 2011.

Laury, Susan K.; McInnes, Melayne Morgan; "The impace of insurance prices on decision making biases: An experimental analysis;" Jun. 2003; Journal of Risk & Insurance; vol. 70 No. 2; ISSN: 0022-4367.

Irvine, Benedict; "Health care superieur: Does the UK need French lessons;" May/Jun. 2001; Consumer Policy Review, vol. 11 No. 3; pp. 92-100; Journal Code: CPW.

Knight-Ridder Tribune Business News; "Milwaukee-Area Businesses Initiate Plan to Cut Health Costs;" Sep. 2, 2003; Supplier No. 107223132.

Notice of Allowance for U.S. Appl. No. 11/759,767 mailed Apr. 25, 2013.

Non-Final Office Action for U.S. Appl. No. 13/208,811 mailed Oct. 4, 2013.

* cited by examiner

SYSTEMS AND METHODS FOR GENERATING EDITS FOR HEALTHCARE TRANSACTIONS TO ADDRESS BILLING DISCREPANCIES

FIELD OF THE INVENTION

Aspects of the invention relate generally to healthcare transactions, and more particularly, to the generation of edits for healthcare transactions to address billing discrepancies.

BACKGROUND OF THE INVENTION

Healthcare providers, such as pharmacies, physicians, and/or hospitals, often generate healthcare transactions, such as healthcare claim transactions that are communicated to appropriate claims processors or payers, such as insurance providers or government payers, for approval. Subsequent to the approval of a healthcare transaction, a claims processor or a third-party may audit the transaction in order to determine whether the transaction satisfies the requirements of various state, federal, and/or third-party protocols. If a discrepancy is identified during the audit, then the healthcare provider is typically presented with a charge-back for the healthcare transaction or a demand to submit a corrected version of the healthcare transaction to avoid a charge-back.

Recently, auditing of healthcare transactions has experienced significant growth, leading to an increase in, expenses on the part of healthcare providers in order to identify and correct the problems or discrepancies leading to charge-backs or demands to resubmit healthcare transactions. It is typically time consuming and relatively expensive for a healthcare provider to identify an area for improvement during the generation of healthcare transactions in order to avoid negative audit results.

Therefore, systems and methods for generating edits for healthcare transactions to address billing discrepancies are desirable.

BRIEF DESCRIPTION OF THE INVENTION

Some or all of the above needs and/or problems may be addressed by certain embodiments of the invention. Embodiments of the invention may include systems, methods, and apparatus for generating edits for healthcare transactions to address billing discrepancies. In one embodiment, a method for generating an edit for processing healthcare transactions is provided. Information associated with an audit performed on a healthcare transaction may be received. Based at least in part on the received information, a billing discrepancy associated with the healthcare transaction may be identified. Based at least in part upon the identified billing discrepancy, a proposed edit may be generated that can be utilized to mitigate an impact of the identified billing discrepancy during the processing of one or more subsequent healthcare transactions. In certain embodiments, the above operations may be performed by one or more computers associated with a service provider.

In accordance with another embodiment of the invention, a system for the generation of an edit for processing healthcare transactions may be provided. The system may include at least one memory and at least one processor. The at least one memory may be operable to store computer-executable instructions. The at least one processor may be configured to access the at least one memory and execute the computer-executable instructions to: receive information associated with an audit performed on a healthcare transaction; identify, based at least in part on the received information, a billing discrepancy associated with the healthcare transaction; and generate, based at least in part upon the identified billing discrepancy, a proposed edit that can be utilized to mitigate an impact of the identified billing discrepancy during the processing of one or more subsequent healthcare transactions.

In accordance with yet another embodiment of the invention, a method for generating an edit for processing healthcare transactions is provided. One or more audit records associated with one or more respective healthcare transactions may be received. Based at least in part upon an analysis of the one or more audit records, a proposed edit may be generated that can be utilized to process one or more subsequent healthcare transactions and mitigate an impact of a billing discrepancy associated with the one or more healthcare transactions. In certain embodiments, the above operations may be performed by one or more computers associated with a service provider.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
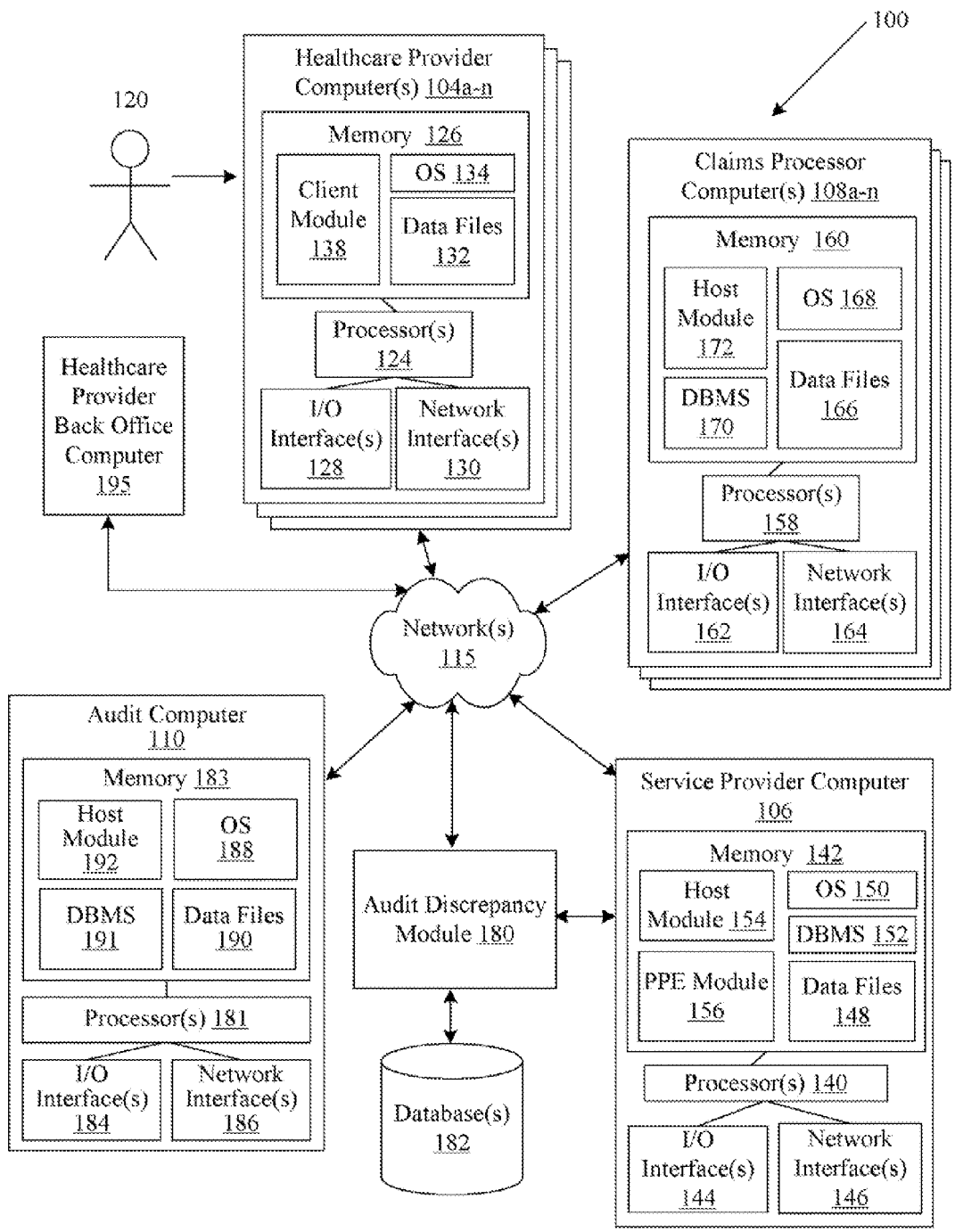
FIG. 1 illustrates an example overview of a system that facilitates the generation of edits for healthcare transactions based upon audit information, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, and apparatus for the generation of healthcare transaction edits based upon information associated with healthcare transaction audits. In one embodiment, information associated with one or more audits performed on healthcare transactions, such as one or more audit records, may be received.

The audit information may be received from claims processors and/or from audit computers or third-party audit systems that conducted audits on previously adjudicated and/or approved healthcare transactions. Alternatively, the audit information may be received by accessing a data storage device (e.g., a database), or the audit information may be received directly from a healthcare provider. Based at least in part on the received information, a billing discrepancy associated with one or more healthcare transactions, such as a reason for a charge-back or a reason for requesting a resubmission or re-bill of one or more healthcare transactions, may be identified. Based upon the identified billing discrepancy, a proposed edit may be generated that can be utilized to mitigate an impact of the identified billing discrepancy during the processing of one or more subsequent healthcare transactions. In certain embodiments, the billing discrepancy may be analyzed utilizing one or more rules associated with the generation of a proposed edit, and a proposed edit may be generated based upon the analysis. For example, an impact and/or a potential impact of the billing discrepancy may be determined, and the determined impact may be compared to a threshold value associated with generating a proposed edit. A proposed edit may then be generated if the determined impact exceeds or satisfies a threshold value.

Following the generation of a proposed edit, approval to implement the proposed edit may be received or otherwise identified. In certain embodiments, a proposed edit may be communicated to a healthcare provider for approval, and the proposed edit may be implemented based upon the receipt of an approval from the healthcare provider. In other embodiments, a determination may be made that the proposed edit should be automatically approved or automatically authorized. For example, a determined impact or potential impact of the proposed edit may be analyzed utilizing one or more automatic approval parameters, and the proposed edit may be automatically approved for implementation based upon the analysis. Once approved, the proposed edit may be implemented in order to process subsequent healthcare transactions (e.g., prescription healthcare claim transactions). In this regard, healthcare transactions that may result in the billing discrepancy in the event of an audit may be identified and corrected prior to being communicated to a claims processor for adjudication or other processing.

System Overview

An example system 100 for facilitating the generation of edits for healthcare transactions based upon audit information will now be described illustratively with respect to FIG. 1. As shown in FIG. 1, the system 100 may include one or more healthcare provider computers 104a-n, service provider computers 106, claims processor computers 108a-n, and audit computers 110. As desired, each of the healthcare provider computers 104a-n, service provider computer 106, claims processor computers 108a-n, and audit computer 110 may include one or more processing devices that may be configured for accessing and reading associated computer-readable media having stored thereon data and/or computer-executable instructions for implementing the various methods of the invention.

Additionally, in certain embodiments, the service provider computer 106 may include or otherwise be in communication with an audit discrepancy module 180 or an audit discrepancy application, which may access and/or be in communication with one or more suitable data storage devices 182 and/or databases. The audit discrepancy module 180 may receive or otherwise obtain information associated with one or more audits that have been conducted on previously processed and/or approved healthcare transactions. The audit discrepancy module 180 may analyze the audit information to identify a billing discrepancy or other error associated with the healthcare transactions. In other words, the audit discrepancy module 180 may identify an element or portion of one or more healthcare transactions that has led to a negative audit result, such as a charge-back or a request to re-bill and/or resubmit a transaction. The audit discrepancy module 180 may then generate one or more proposed edits that are intended to address the identified billing discrepancy during the processing of subsequent healthcare transactions and/or mitigate the impact of the identified audit discrepancy. As desired, the generation of a proposed edit may be based upon any number of edit generation rules or parameters that are utilized by the audit discrepancy module 180. Once a proposed edit has been generated, the audit discrepancy module 180 may determine whether the edit should be implemented based upon a received approval or an automatic approval by a healthcare provider or group of healthcare providers.

Generally, network devices and systems, including one or more of the healthcare provider computers 104a-n, service provider computer 106, claims processor computers 108a-n, and audit computer 110 may include or otherwise be associated with suitable hardware and/or software for transmitting and receiving data and/or computer-executable instructions over one or more communications links or networks. These network devices and systems may also include any number of processors for processing data and executing computer-executable instructions, as well as other internal and peripheral components that are well-known in the art. Further, these network devices and systems may include or be in communication with any number of suitable memory devices operable to store data and/or computer-executable instructions. By executing computer-executable instructions, each of the network devices may form a special purpose computer or particular machine. As used herein, the term "computer-readable medium" describes any form of suitable memory or memory device.

As shown in FIG. 1, the healthcare provider computers 104a-n, service provider computer 106, claims processor computers 108a-n, and audit computer 110 may be in communication with each other via one or more networks, such as network 115, which as described below can include one or more separate or shared private and public networks, including the Internet or a publicly switched telephone network. Each of these components—the healthcare provider computers 104a-n, service provider computer 106, claims processor computers 108a-n, audit computer 110, and the network 115—will now be discussed in further detail.

Any number of healthcare provider computers 104a-n may be provided. Each healthcare provider computer (generally referred to as a healthcare provider computer 104) may be associated with a healthcare provider, for example, a pharmacy, physician's office, hospital, etc. The healthcare provider computer 104 may be any suitable processor-driven device that facilitates the processing of healthcare requests (e.g., prescription orders) made by or on behalf of patients 120 or consumers 120 and the communication of information associated with healthcare transaction requests (e.g., healthcare claim transactions, healthcare claim requests, eligibility transaction requests, etc.) to the service provider computer 106. The healthcare provider computer 104 may additionally facilitate the receipt of information associated with proposed edits to be utilized by the service provider computer 106 and/or the approval of a proposed edit. For example, the healthcare provider computer 104 may be a computing device that includes any number of server computers, mainframe computers, networked computers, desktop computers, personal computers, digital assistants, personal digital assistants, digital tablets, Internet appliances, application-specific circuits, microcontrollers, minicomputers, and/or any other processor-based device(s). In certain embodiments, the healthcare provider computer 104 may be a suitable point of sale device associated with a healthcare provider. The execution of the computer-implemented instructions by the healthcare provider computer 104 may form a special purpose computer or other particular machine that is operable to facilitate the processing of healthcare requests (e.g., prescription orders) made by or on behalf of patients and the communication of information associated with healthcare transaction requests (e.g., claim requests and/or healthcare claim transactions, eligibility transaction requests, etc.) to a service provider computer 106. Additionally, in certain embodiments of the invention, the operations and/or control of the healthcare provider computer 104 may be distributed among several processing components.

In addition to having one or more processors 124, the healthcare provider computer 104 may include one or more memory devices 126, one or more input/output ("I/O") interface(s) 128, and one or more network interface(s) 130. The memory devices 126 may be any suitable memory device, for example, caches, read only memory devices, random access memory devices, magnetic storage devices, removable storage devices, etc. The memory devices 126 may store data, executable instructions, and/or various program modules utilized by the healthcare provider computer 104, for example, data files 132, an operating system ("OS") 134, and/or a client module 138. The data files 132 may include any suitable data that facilitates the receipt and/or processing of healthcare requests (e.g., prescription orders) by the healthcare provider computer 104 and the generation and/or processing of healthcare transaction requests (e.g., healthcare claim requests, healthcare claim transactions, eligibility transaction requests, etc.) that are communicated to the service provider computer 106. For example, the data files 132 may include, but are not limited to, information associated with the service provider computer 106, information associated with one or more claims processors or payers, and/or information associated with one or more healthcare transaction requests. The OS 134 may be a suitable software module that controls the general operation of the healthcare provider computer 104. The OS 134 may also facilitate the execution of other software modules by the one or more processors 124, for example, the client module 138. The OS 134 may be, but is not limited to, Microsoft Windows®, Apple OSX™, Linux, Unix, or a mainframe operating system. The client module 138 may be an Internet browser or other software, including a dedicated program, for interacting with the service provider computer 106. For example, a user, such as a pharmacist or other pharmacy employee, may utilize the client module 138 in preparing and providing a prescription claim request to the service provider computer 106 for delivery to one or more appropriate claims processor computers 108, for adjudication or other coverage/benefits determination. The healthcare provider computer 104 may also utilize the client module 138 to retrieve or otherwise receive data, messages, or responses from the service provider computer 106 and/or other components of the system 100. For example, in certain embodiments, the client module 138 may be utilized to receive information associated with a proposed edit generated by the audit discrepancy module 180.

In operation, the healthcare provider computer 104 may receive information associated with a healthcare request (e.g., prescription order) from a patient. As one example, the healthcare provider computer 104 may receive information associated with a healthcare request for a patient at a point of sale, such as in a pharmacy during a prescription fulfillment or purchase transaction or at a physician's office during the provision of a healthcare service. As another example, the healthcare provider computer 104 may electronically receive a healthcare request from a physician computer, a patient computer, or other patient device. The healthcare provider computer 104 may generate a healthcare transaction request (e.g., healthcare claim request, healthcare claim transaction, eligibility transaction request, etc.), and information associated with the healthcare transaction request may be communicated to the service provider computer 106. The healthcare provider computer 104 may then receive one or more responses to the healthcare transaction requests, such as an adjudicated reply for a claim transaction, a rejection message associated with a transaction, and/or one or more messages generated by the service provider computer 106 and/or the audit discrepancy module 180. Additionally, as desired, the healthcare provider computer 104 may receive one or more audit records associated with audits performed on healthcare transaction requests and/or their adjudicated replies or responses and/or information associated with proposed edits intended to address billing discrepancies identified from audit information.

The one or more I/O interfaces 128 may facilitate communication between the healthcare provider computer 104 and one or more input/output devices, for example, one or more user interface devices, such as a display, keypad, control panel, touch screen display, remote control, microphone, etc., that facilitate user interaction with the healthcare provider computer 104. For example, the one or more I/O interfaces 128 may facilitate entry of information associated with a healthcare transaction request (e.g., healthcare claim transaction, healthcare claim request, eligibility transaction request, etc.) by an employee of a healthcare provider, such as a pharmacy employee. The one or more network interfaces 130 may facilitate connection of the healthcare provider computer 104 to one or more suitable networks, for example, the network 115 illustrated in FIG. 1. In this regard, the healthcare provider computer 104 may receive and/or communicate information to other network components of the system 100, such as the service provider computer 106.

In certain embodiments, the healthcare provider computer 104 can further include a facsimile/printing device operative to receive and print one or more messages received from the service provider computer 106 and/or the audit discrepancy module 180. For example, as described further below, the service provider computer 106 may on occasion transmit a facsimile or other printing command to the healthcare provider computer 104 and/or the facsimile/printing device containing one or more messages associated with available payers for patients and/or the resubmission of healthcare claim transactions to available payers. The transmission from the service provider computer 106 may be directly to the facsimile/printing device, such as may be accomplished via a network 115 (e.g., Internet, cellular network, wireless network, or any other similar network, etc.). In another embodiment, the transmission may be to the healthcare provider computer 104, which in turn communicates with and commands the facsimile/printing device to print a message. Although the term facsimile/printing device is used throughout this description, it is appreciated that any other device operable to receive and print or generate a display of a notification message may be included within the scope of a facsimile/printing device. Examples of other devices include, but are not limited to, a mobile device (e.g., cellular telephone, personal digital assistant, personal information device, etc.), a personal computer, a computer kiosk, or any other handheld or mobile devices.

With continued reference to FIG. 1, the service provider computer 106 may include, but is not limited to, any suitable processor-driven device that is configured for receiving, processing, and fulfilling requests from the healthcare provider computers 104a-n and/or claims processor computers 108a-n relating to prescription, pharmacy, benefits, eligibility, and/or healthcare transactions and/or other activities. In certain embodiments, the service provider computer 106 may be a switch/router that routes healthcare transactions comprising requests and replies/responses. For example, the service provider computer 106 may route billing requests and/or prescription claim requests communicated from healthcare provider computers 104a-n to claims processor computers 108a-n, which may be associated with pharmacy benefits managers ("PBM"), insurers, government payers, or claims clearinghouses. The service provider computer 106 may then route adjudicated replies or other responses to the claim requests from the claims processor computers 108a-n to the healthcare provider computers 104a-n. Additionally, as described in greater detail below, the service provider computer 106 and/or an associated audit discrepancy module 180 may be configured for receiving information associated with healthcare audits and processing the received information in order to generate one or more proposed edits. For example, audit information may be received from any number of audit computers 110, claims processor computers 108a-n, healthcare provider computers 104a-n, and/or other sources. At least a portion of the received audit information may be analyzed in order to identify a billing discrepancy associated with one or more healthcare transactions. One or more proposed edits may then be generated in order to address the identified billing discrepancy. In certain embodiments; the service provider computer 106 may include a suitable host server, host module, or other software that facilitates the receipt of a healthcare transaction request or reply and/or the routing of the transaction request or reply to a recipient. Any number of healthcare provider computers and/or claims processor computers may be in communication with the service provider computer 106 as desired in various embodiments of the invention.

The service provider computer 106 may include any number of special purpose computers or other particular machines, application-specific circuits, microcontrollers, personal computers, minicomputers, mainframe computers, servers, networked computers, and/or other processor-driven devices. In certain embodiments, the operations of the service provider computer 106 may be controlled by computer-executed or computer-implemented instructions that are executed by one or more processors associated with the service provider computer 106 to form a special purpose computer or other particular machine that is operable to facilitate the receipt, routing, and/or processing of healthcare claim requests or healthcare claim transactions. Additionally, the execution of computer-executed or computer-implemented instructions may form a special purpose computer or other particular machine that is operable to facilitate the receipt of audit information and/or the processing of the audit information in order to generate proposed edits for processing subsequent healthcare transactions. The one or more processors that control the operations of the service provider computer 106 may be incorporated into the service provider computer 106 and/or may be in communication with the service provider computer 106 via one or more suitable networks. In certain embodiments of the invention, the operations and/or control of the service provider computer 106 may be distributed among several processing components.

Similar to the healthcare provider computer 104, the service provider computer 106 may include one or more processors 140, one or more memory devices 142, one or more input/output ("I/O") interface(s) 144, and one or more network interfaces 146. The one or more memory devices 142 may be any suitable memory devices, for example, caches, read only memory devices, random access memory devices, magnetic storage devices, removable memory devices, etc. The one or more memory devices 142 may store data, executable instructions, and/or various program modules utilized by the service provider computer 106, for example, data files 148, an operating system ("OS") 150, the host module 154, a pre- and post-edit ("PPE") module 156, and a database management system ("DBMS") 152 to facilitate management of the data files 148 and other data stored in the memory devices 142 and/or one or more databases or data storage devices 182. The OS 150 may be, but is not limited to, Microsoft Windows®, Apple OSX™, Linux, Unix, or a mainframe operating system. The OS 150 may be a suitable software module that controls the general operation of the service provider computer 106 and/or that facilitates the execution of other software modules.

The PPE module 156 may be operable to perform one or more pre-edits on a received healthcare transaction, such as a claim transaction, prior to routing or otherwise communicating the received healthcare transaction to a recipient, such as a claims processor computer 108. Additionally, the PPE module 156 may be operable to perform one or more post-edits on an adjudicated reply or response that is received from a claims processor computer 108 for a healthcare claim transaction prior to routing the adjudicated reply to the healthcare provider computer 104. A wide variety of different pre-edits and/or post-edits may be performed as desired in various embodiments of the invention. In certain embodiments, a pre- or post-edit may be generated by the audit discrepancy module 180 and implemented by the PPE module 156 in order to process a healthcare transaction or response.

According to an embodiment of the invention, the data files 148 may store healthcare transaction records associated with communications received from various healthcare provider computers 104a-n and/or various claims processor computers 108a-n. The data files 148 may also store any number of suitable routing tables that facilitate determining the destination of communications received from a healthcare provider computer 104 or claims processor computer 108. As desired, the data files 148 may additionally store audit information associated with audited healthcare transactions and/or information associated with sources of audit information, such as one or more audit computers 110. The host module 154 may receive, process, and respond to requests from the respective client modules 138 of the healthcare provider computers 104a-n, and may further receive, process, and respond to requests of the respective host modules 172 of the various claims processor computers 108a-n. The service provider computer 106 may include additional program modules for performing other processing methods described herein. Those of ordinary skill in the art will appreciate that the service provider computer 106 may include alternate and/or additional components, hardware or software without departing from example embodiments of the invention.

With continued reference to the service provider computer 106, the one or more I/O interfaces 144 may facilitate communication between the service provider computer 106 and one or more input/output devices, for example, one or more user interface devices, such as a display, keypad, control panel, touch screen display, remote control, microphone, etc., that facilitate user interaction with the service provider computer 106. The one or more network interfaces 146 may facilitate connection of the service provider computer 106 to one or more suitable networks, for example, the network 115 illustrated in FIG. 1. In this regard, the service provider computer 106 may communicate with other components of the system 100.

With continued reference to FIG. 1, any number of claims processor computers 108a-n may be provided. Each claims processor computer (generally referred to as claims processor computer 108) may be any suitable processor-driven device that facilitates receiving, processing, and/or fulfilling healthcare transactions, such as healthcare claim transactions, received from the service provider computer 106. For example, a claims processor computer 108 may be a processor-driven device associated with a pharmacy benefits manager ("PBM"), an insurer, a government payer, or a claims clearinghouse. As desired, the claims processor computer 108 may include any number of special purpose computers or other particular machines, application-specific circuits, microcontrollers, personal computers, minicomputers, mainframe computers, servers, and the like. In certain embodiments, the operations of a claims processor computer 108 may be controlled by computer-executed or computer-implemented instructions that are executed by one or more processors associated with the claims processor computer 108 to form a special purpose computer or other particular machine that is operable to facilitate the receipt, processing, and/or fulfillment of healthcare transaction requests received from the service provider computer 106. Additionally, as desired, a special purpose computer or other particular machine may be formed that is operable to facilitate the auditing of healthcare transactions and/or the provision of audit information to the service provider computer 106. The one or more processors that control the operations of the claims processor computer 108 may be incorporated into the claims processor computer 108 and/or in communication with the claims processor computer 108 via one or more suitable networks. In certain embodiments of the invention, the operations and/or control of the claims processor computer 108 may be distributed among several processing components.

Similar to other components of the system 100, each claims processor computer 108 may include one or more processors 158, one or more memory devices 160, one or more input/output ("I/O") interface(s) 162, and one or more network interfaces 164. The one or more memory devices 160 may be any suitable memory devices, for example, caches, read only memory devices, random access memory devices, magnetic storage devices, removable memory devices, etc. The one or more memory devices 160 may store data, executable instructions, and/or various program modules utilized by the claims processor computer 108, for example, data files 166, an operating system ("OS") 168, a database management system ("DBMS") 170, and a host module 172. The data files 166 may include any suitable information that is utilized by the claims processor computer 108 to process and/or audit healthcare transactions, for example, patient profiles, patient insurance information, other information associated with a patient, information associated with a healthcare provider, information associated with financial coverage information, etc. The OS 168 may be a suitable software module that controls the general operation of the claims processor computer 108. The OS 168 may also facilitate the execution of other software modules by the one or more processors 158, for example, the DBMS 170 and/or the host module 172. The OS 168 may be, but is not limited to, Microsoft Windows®, Apple OSX™, Linux, Unix, or a mainframe operating system. The DBMS 170 may be a suitable software module that facilitates access and management of one or more databases that are utilized to store information that is utilized by the claims processor computer 108 in various embodiments of the invention. The host module 172 may initiate, receive, process, and/or respond to healthcare transaction requests, such as healthcare claim transactions or claim requests, from the host module 154 of the service provider computer 106. The claims processor computer 108 may include additional program modules for performing other pre-processing or post-processing methods described herein, such as an audit process. Those of ordinary skill in the art will appreciate that the claims processor computer 108 may include alternate and/or additional components, hardware or software without departing from example embodiments of the invention.

The one or more I/O interfaces 162 may facilitate communication between the claims processor computer 108 and one or more input/output devices, for example, one or more user interface devices, such as a display, keypad, control panel, touch screen display, remote control, microphone, etc., that facilitate user interaction with the claims processor computer 108. The one or more network interfaces 164 may facilitate connection of the claims processor computer 108 to one or more suitable networks, for example, the network 115 illustrated in FIG. 1. In this regard, the claims processor computer 108 may receive healthcare transactions and/or other communications from the service provider computer 106, and the claims processor computer 108 may communicate information associated with processing transactions to the service provider.

With continued reference to FIG. 1, one or more audit computers 110 may be provided. Each audit computer 110 may be any suitable processor-driven device that is configured to audit healthcare transactions, such as approved or adjudicated healthcare claim transactions. In this regard, the audit computer 110 may review healthcare transactions for billing accuracy in accordance with state, federal, and/or third-party protocols. The audit computer 110 may identify exceptions or discrepancies in audited healthcare transactions, and the identified exceptions may be utilized in attempts to recapture monies paid to healthcare providers. For example, the audit computer 110 may be a processor-driven device associated with an audit service provider or one or more payers. As desired, the audit computer 110 may include any number of special purpose computers or other particular machines, application-specific circuits, microcontrollers, personal computers, minicomputers, mainframe computers, servers, and the like. In certain embodiments, the operations of the audit computer 110 may be controlled by computer-executed or computer-implemented instructions that are executed by one or more processors 181 associated with the audit computer 110 to form a special purpose computer or other particular machine that is operable to facilitate the receipt of healthcare transaction information and/or audit requests and perform an audit on any number of healthcare transactions. The one or more processors that control the operations of the audit computer 110 may be incorporated into the audit computer 110 and/or in communication with the audit computer 110 via one or more suitable networks. In certain embodiments of the invention, the operations and/or control of the audit computer 110 may be distributed among several processing components.

Similar to other components of the system 100, the audit computer 110 may include one or more processors 181, one or more memory devices 183, one or more I/O interfaces 184, and/or one or more network interfaces 186. The one or more memory devices 183 may be any suitable memory devices, for example, caches, read only memory devices, random access memory devices, magnetic storage devices, removable memory devices, etc. The one or more memory devices 183 may store data, executable instructions, and/or various program modules utilized by the audit computer 110, for example, data files 190, an operating system ("OS") 188, a database management system ("DBMS") 191, and a host module 192. The data files 190 may include any suitable information that is utilized by the audit computer 110 to perform a healthcare transaction audit, for example, healthcare transaction information, coverage information for one or more payers, one or more billing rules and/or requirements associated with a payer, etc. It will be appreciated that the same or similar information as provided by the data files 190 could likewise be stored in a data storage device similar to the data storage device 182 that is described below. Likewise, in some example embodiments of the invention, the audit computer 110 could likewise be implemented as part of a claims processor computer 108 or the service provider computer 106 without departing from example embodiments of the invention.

Still referring to the audit computer 110, the OS 188 may be a suitable software module that controls the general operation of the audit computer 110. The OS 188 may also facilitate the execution of other software modules by the one or more processors 181, for example, the DBMS 191 and/or the host module 192. The OS 188 may be, but is not limited to, Microsoft Windows®, Apple OSX™, Linux, Unix, or a mainframe operating system. The DBMS 191 may be a suitable software module that facilitates access and management of one or more databases that are utilized to store information that is utilized by the audit computer 110 in various embodiments of the invention. The host module 192 may receive information associated with healthcare transactions and facilitate an audit of one or more healthcare transactions. Additionally, the host module 192 may facilitate the receipt of a request for information associated with one or more conducted audits and/or the communication of audit information to another component of the system 100, such as the service provider computer 106 and/or the audit discrepancy module 180. The audit computer 110 may review a wide variety of information associated with a healthcare transaction when conducting an audit, for example, a quantity and days supply, an other coverage code, a dispense as written ("DAW") code, etc. Those of ordinary skill in the art will appreciate that the audit computer 110 may include alternate and/or additional components, hardware or software without departing from example embodiments of the invention.

The healthcare provider back office computer 195 may be one or more computers associated with a group of healthcare providers, such as a chain of pharmacies. The healthcare provider back office computer 195 may include components that are similar to those of other devices included in the system 100, such as the healthcare provider computer 104. For example, the healthcare provider back office computer 195 may be a processor-driven device that is operable or configured to provide, to the service provider computer 106 and/or the audit discrepancy module 180, any number of parameters, rules, and/or preferences associated with the generation of proposed edits based upon audit information. Additionally, the healthcare provider back office computer 195 may be operable or configured to receive information associated with proposed edits and/or various reports and/or billing information associated with the generation of proposed edits and/or the processing of healthcare claim transactions by one or more generated edits.

The network 115 may include any telecommunication and/or data network, whether public, private, or a combination thereof, including a local area network, a wide area network, an intranet, the Internet, intermediate handheld data transfer devices, and/or any combination thereof and may be wired and/or wireless. The network 115 may also allow for real time, offline, and/or batch transactions to be transmitted between or among the healthcare provider computers 104a-n, the service provider computer 106, and the claims processor computers 108a-n. Due to network connectivity, various methodologies as described herein may be practiced in the context of distributed computing environments. Although the service provider computer 106 is shown for simplicity as being in communication with the healthcare provider computers 104a-n, the claims processor computers 108a-n, and/or the audit computer 110 via one intervening network 115, it is to be understood that any other network configuration is possible. For example, intervening network 115 may include a plurality of networks, each with devices such as gateways and routers for providing connectivity between or among networks 115. Instead of or in addition to a network 115, dedicated communication links may be used to connect the various devices in accordance with an example embodiment of the invention. For example, the service provider computer 106 may form the basis of network 115 that interconnects the healthcare provider computers 104a-n and the claims processor computers 108a-n.

An audit discrepancy module 180 or audit discrepancy application may also be operative with the service provider computer 106. The audit discrepancy module 180 may include computer-executable instructions for analyzing information associated with audits performed on healthcare transactions, identifying or otherwise determining a billing discrepancy associated with one or more healthcare transactions based upon the audit information, and/or generating one or more proposed edits in order to address a billing discrepancy or mitigate an impact of a billing discrepancy. In certain embodiments, a proposed edit generated by the module 180 may be implemented as a pre-edit or a post-edit that may be utilized to process subsequent healthcare transactions.

In operation, the audit discrepancy module 180 may receive information associated with audits conducted on one or more healthcare transactions, such as one or more healthcare claim transactions. As one example, the audit discrepancy module 180 may receive one or more audit records that include information associated with audited healthcare transactions and the results of the conducted audits. A wide variety of information associated with a healthcare transaction may be included in an audit record, for example, an identifier of the healthcare transaction (e.g., a prescription number, etc.), an identifier of a product included in the healthcare transaction (e.g., a National Drug Code ("NDC"), a Universal Product Code ("UPC"), a Stock Keeping Unit ("SKU"), etc.), an identifier of a healthcare provider (e.g., a pharmacy identifier, store number, etc.), a date of a healthcare transaction, an exception generated by an audit, etc. Audit information may be received from audit computers 110, claims processor computers 108a-n, and/or any other suitable sources of audit information.

Once audit information has been received, the audit discrepancy module 180 may analyze at least a portion of the received audit information in order to identify a billing discrepancy associated with one or more audited healthcare transactions. A billing discrepancy may be a billing error or exception that has been identified by an audit. A wide variety of billing discrepancies may be identified as desired in various embodiments of the invention, such as a reason for a charge-back or requested charge-back associated with one or more healthcare transactions, a reason for a request to re-bill a healthcare transaction in order to avoid a charge-back, etc. As desired, audit information may be sorted by the audit discrepancy module 180 prior to the audit information being analyzed. For example, audits associated with a particular healthcare provider or group of healthcare providers (e.g., a pharmacy chain), audits associated with a particular claims processor (e.g., a claims processor identified by a BIN), audits associated with a desired classification of products (e.g., a therapeutic classification of products), and/or audits associated with particular products (e.g., products identified by a NDC, UPC, and/or SKU) may be analyzed by the audit discrepancy module 180 in order to identify a billing discrepancy. In certain embodiments, the sorting of audit information may be based upon preferences and/or parameters of a healthcare provider or group of healthcare providers. In this regard, a review of audit information may be scoped as desired by a healthcare provider.

Once a billing discrepancy has been identified, the audit discrepancy module 180 may analyze the identified discrepancy utilizing one or more edit generation rules or parameters. Based upon the analysis, the audit discrepancy module 180 may determine whether a proposed edit should be generated in order to address the identified billing discrepancy and/or mitigate an impact of the identified billing discrepancy. For example, the audit discrepancy module 180 may access and/or receive one or more rules associated with the generation of proposed edits. The rules may be associated with a healthcare provider and/or a group of healthcare providers (e.g., a pharmacy chain). A wide variety of different types of rules associated with the generation of proposed edits may be utilized as desired in various embodiments of the invention, for example, threshold rules and/or threshold conditions associated with the generation of a proposed edit.

As one example, one or more rules associated with a financial tolerance level, a financial impact, and/or a potential financial impact may be utilized to assess a billing discrepancy in order to determine whether a proposed edit should be generated. In other words, a financial assessment associated with the billing discrepancy may be performed and analyzed in order to determine whether a proposed edit should be generated in order to mitigate the impact of the billing discrepancy. As desired, a financial impact and/or a potential financial impact of the billing discrepancy may be determined. The financial impact may include, but is not limited to, a total incurred financial cost (e.g., weekly, monthly, year to date, annual, cost subsequent to a specified start date, etc.) associated with charge-backs and/or reprocessing costs for audited healthcare transactions, an average financial cost per healthcare transaction for charge-backs and/or reprocessing, and/or an expected future financial cost or potential cost (e.g., a per transaction cost, a total cost, etc.) associated with the billing discrepancy. As desired, the audit discrepancy module 180 may access stored information associated with healthcare transactions routed through the service provider computer 106 in order to determine a potential impact of the billing discrepancy. For example, the audit discrepancy module 180 may access stored information in order to determine a number of healthcare transactions associated with a healthcare provider that are subject to an audit that may result in the billing discrepancy and/or a percentage of the transactions that are audited in order to extrapolate or otherwise determine a potential impact of the billing discrepancy. A wide variety of statistical and/or data processing techniques and/or methods may be utilized as desired to determine or calculate a financial impact and/or potential impact. Once a financial impact or potential impact has been determined or calculated, the determined impact may be compared to one or more impact tolerance rules. If the determined impact exceeds a threshold impact amount, then a determination may be made that a proposed edit should be generated to address the billing discrepancy.

As another example, one or more rules associated with a number of healthcare transactions affected and/or potentially affected by the identified billing discrepancy and/or a percentage of healthcare transactions affected and/or potentially affected by the identified billing discrepancy may be utilized to assess a billing discrepancy in order to determine whether a proposed edit should be generated. In other words, the audit discrepancy module 180 may determine a number or percentage of healthcare transactions that have been affected by and/or that may potentially be affected by the identified billing discrepancy. As desired, the audit discrepancy module 180 may access stored information associated with healthcare transactions routed through the service provider computer 106 in order to determine a number or percentage of healthcare transactions affected by or potentially affected by the billing discrepancy. A wide variety of statistical and/or data processing techniques and/or methods may be utilized as desired to determine a number or percentage of impacted and/or potentially impacted healthcare transactions. Once an impact or potential impact has been determined, the determined impact may be compared to one or more impact tolerance rules. If the determined impact exceeds a threshold impact value, then a determination may be made that a proposed edit should be generated to address the billing discrepancy. A wide variety of tolerance and/or impact rules may be utilized as desired in order to determine whether a proposed edit should be generated. The rules set forth above are provided by way of example only.

If the audit discrepancy module 180 determines that a proposed edit should not be generated, then the operations of the audit discrepancy module 180 may end. As desired, information associated with the analysis conducted by the audit discrepancy module 180 may be stored in one or more suitable databases 182 or data storage devices. However, if the audit discrepancy module 180 determines that a proposed edit should be generated, then the audit discrepancy module 180 may generate one or more proposed edits. The generated proposed edits may be designed to mitigate an impact of the identified billing discrepancy. For example, a generated edit may be utilized to process a subsequent healthcare transaction that is routed through the service provider. During the processing, the edit may identify a situation that would likely trigger an exception or billing discrepancy in the event of a subsequent audit conducted on the healthcare transaction. In this regard, the healthcare transaction may be corrected and/or rejected for correction by a submitting healthcare provider prior to the healthcare transaction being routed to a claims processor. Generated edits may be utilized to process adjudicated replies or other responses in a similar manner. A wide variety of proposed edits may be generated as desired in various embodiments of the invention. Additionally, the generation of the edit may be based at least in part on the identified billing discrepancy that is being addressed.

Once a proposed edit has been generated, a determination may be made as to whether the proposed edit has been authorized for implementation. In certain embodiments, a message including the proposed edit may be communicated to a healthcare provider for approval. For example, a message may be communicated to a healthcare provider computer 104 or a healthcare provider back office computer 195 for approval. As desired, information associated with an identified billing discrepancy, a determined or calculated impact and/or potential impact of the billing discrepancy, and/or a potential cost savings associated with implementing the proposed edit may also be communicated to the healthcare provider. This information may assist the healthcare provider in determining whether or not the proposed edit should be approved for implementation. Following the receipt of the message, a healthcare provider may communicate a response to the audit discrepancy module 180 indicating whether or not the proposed edit should be implemented. If a response indicating that the proposed edit should be implemented is received, then the audit discrepancy module 180 and/or the service provider computer 106 may implement the proposed edit in order to process subsequent healthcare transactions and/or their replies. For example, the proposed edit may be implemented as part of the PPE module 156 described above. As desired, a message associated with the implementation of the edit may be communicated to a healthcare provider.

In certain embodiments, the audit discrepancy module 180 may determine whether a proposed edit should be automatically authorized or approved for implementation. For example, the audit discrepancy module 180 may access automatic authorization rules and/or preferences associated with a healthcare provider or a group of healthcare providers, and determine whether the proposed edit should be automatically implemented based upon the rules and/or preferences. As desired, the rules and/or preferences may be similar to those described above with respect to the rules that are utilized to determine whether a proposed edit should be generated. For example, threshold rules associated with a financial impact and/or a number of affected transactions may be utilized in order to determine whether a proposed edit should be automatically authorized and implemented. As desired in certain embodiments, the various threshold values associated with automatic authorization may be approximately the same as or relatively higher than threshold values associated with generating a proposed edit. In one example embodiment, a potential impact associated with implementing the proposed edit may be determined or calculated in a similar manner as that described above. The determined potential impact may then be compared to one or more automatic approval or automatic authorization rules in order to determine whether the proposed edit should be implemented. If it is determined that a proposed edit is automatically authorized or approved, then the audit discrepancy module 180 and/or the service provider computer 106 may implement the proposed edit in order to process subsequent healthcare transactions and/or their replies. As desired, a message associated with the implementation of the edit may be communicated to a healthcare provider. If, however, it is determined that the proposed edit is not automatically authorized, then operations of the audit discrepancy module 180 may either end or, alternatively, information associated with the proposed edit may be communicated to a healthcare provider along with a message seeking approval of the proposed edit.

The data storage devices 182 or databases may be operable to store data as well as information associated with various rules and/or parameters that may be utilized by the audit discrepancy module 180. Examples of data that may be stored include, but are not limited to, audit records and/or other audit information, healthcare transaction information, information associated with identified billing discrepancies, impact information for various billing discrepancies, etc. In certain embodiments, rules may be received from one or more other components of the system 100, such as the healthcare provider computer 104, and/or the healthcare provider back office computer 195, and at least a portion of the received rules may be stored. A wide variety of rules and/or parameters may be received and/or stored, including but not limited to, rules associated with the generation of and/or automatic authorization of proposed edits, rules associated with sorting, filtering, and/or analyzing audit information, etc. In addition to or as an alternative to utilizing certain rules associated with a healthcare provider or group of healthcare providers, one or more default rules may be accessed and utilized by the audit discrepancy module 180. Additionally, in certain embodiments, the data storage devices 182 may be operable to store information associated with healthcare transactions, adjudicated replies, and/or processing performed by the service provider computer 106. In certain embodiments, the data storage devices 182 may additionally store billing information associated with the generation of proposed edits, the implementation of proposed edits, and/or the processing of healthcare transactions utilizing an implemented edit. Additionally, as desired, the data storage devices 182 may store various reports associated with the processing performed by the audit discrepancy module 180 and/or edits generated by the audit discrepancy module 180. The data storage devices 182 may be accessible by the audit discrepancy module 180 and/or the service provider computer 106.

In certain embodiments, the audit discrepancy module 180 and/or the service provider computer 106 may be operable to generate one or more reports that are associated with processed audit information, identified billing discrepancies, proposed edits, and/or implemented edits. A wide variety of different types of reports may be generated as desired in various embodiments of the invention. Additionally, a wide variety of different information may be incorporated into generated reports, including but not limited to, audit information, billing discrepancy information, impact and/or potential impact information for billing discrepancies, proposed and/or implemented edit information, cost savings information associated with implemented edits, and/or billing information associated with the invocation of the audit discrepancy module 180 and/or the processing of subsequent healthcare transactions utilizing an implemented edit. Reports may be sorted or formatted utilizing a wide variety of different criteria, parameters, and/or techniques. Additionally, the audit discrepancy module 180 and/or the service provider computer 106 may communicate or direct the communication of generated reports to one or more other components of the system 100, for example, the healthcare provider computer 104 and/or the healthcare provider back office computer 195. A wide variety of different techniques and/or software programs may be utilized to format a generated report. For example, a report may be formatted as a comma-separated-value ("csv") file, as a spreadsheet file, as a word processor file, as a text file, etc. Additionally, a wide variety of different communication techniques may be utilized to communicate a report to the recipient, including but not limited to, email, short message service ("SMS") messaging, other electronic communications, snail mail, etc. A report may be pushed to a recipient by the audit discrepancy module 180 or other reporting module, or, alternatively pulled from the audit discrepancy module 180 by a recipient submitting a request for one or more reports. Additionally, in certain embodiments, a report may be made available for download from an appropriate web site or server, such as a web site hosted by the service provider computer 106.

Messages and/or reports (e.g., transaction reports and/or other reports) that are generated by the audit discrepancy module 180 and/or the service provider computer 106 may be communicated to a recipient (e.g., the healthcare provider computer 104, the healthcare provider back office computer 195, etc.) by the audit discrepancy module 180 in either a direct or indirect manner. In certain embodiments, messages and/or reports may be directly communicated to a recipient by the audit discrepancy module 180 via one or more suitable networks 115. In other embodiments, the messages and/or reports may be communicated by the audit discrepancy module 180 to another component of the system 100, such as the service provider computer 106, for communication to a recipient. For messages and/or reports that are communicated to a healthcare provider, the communications may be sent to the healthcare provider computer 104 and/or to another device associated with the healthcare provider, such as a facsimile/printing device.

The operations of the audit discrepancy module 180 and/or the data storage devices 182 are described in greater detail below with reference to FIGS. 4-5.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. For example, in one embodiment, the service provider computer 106 (or other computer) may be implemented as a specialized processing machine that includes hardware and/or software for performing the methods described herein. In addition, at least a portion of the processor and/or processing capabilities of the service provider computer 106 and/or the audit discrepancy module 180, may be implemented as part of a claims processor computer 108. Accordingly, embodiments of the invention should not be construed as being limited to any particular operating environment, system architecture, or device configuration.

Operational Overview

Figure 2:
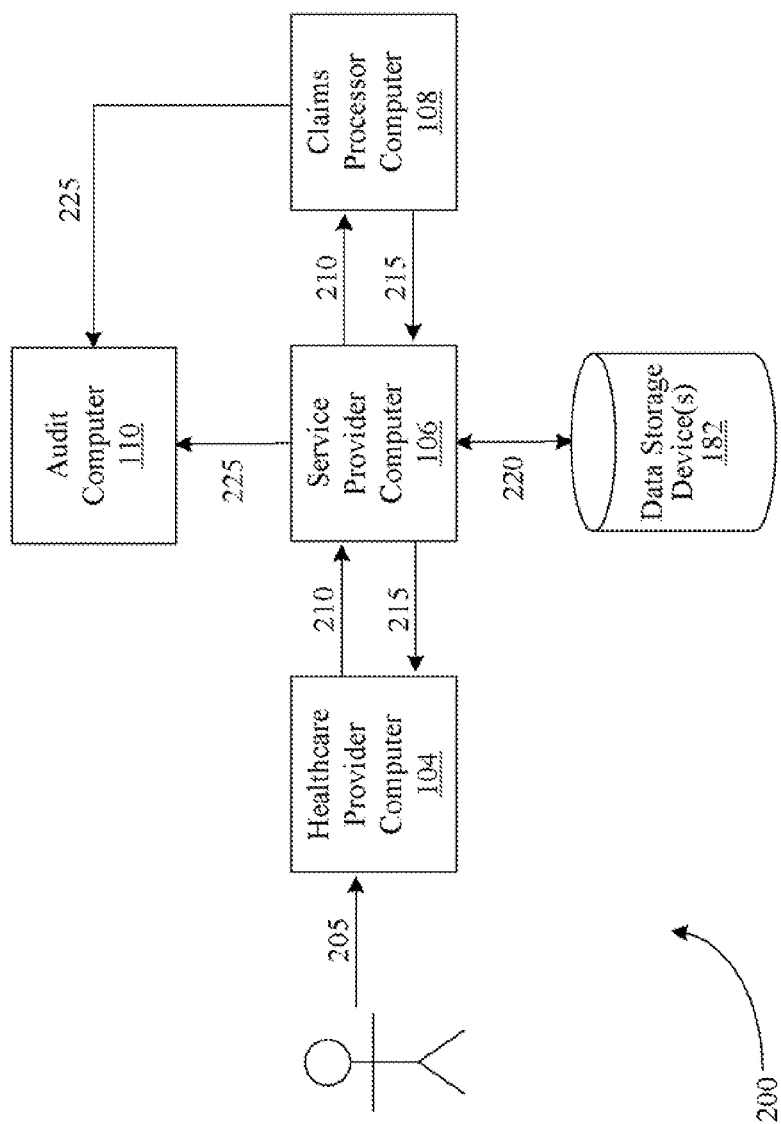
FIG. 2 is a diagram of an example data flow for processing healthcare transactions as they are communicated through a service provider, according to an example embodiment of the invention.

FIG. 2 is a diagram of an example data flow 200 for processing healthcare transactions as they are communicated through a service provider, such as the service provider computer 106 illustrated in FIG. 1. The data flow 200 may represent an example of routing a healthcare transaction received from a healthcare provider to a claims processor for adjudication. With reference to FIG. 2, a healthcare provider computer, such as a healthcare provider computer 104 illustrated in FIG. 1, may receive a healthcare request 205 from a patient. The healthcare request 205 may be a prescription order that is received in-person or electronically as desired in various embodiments of the invention. For example, a patient may seek to fill a prescription for one or more drugs, medications, and/or other products at a pharmacy location or store. As another example, a patient may communicate a healthcare request 205, such as a request to fill a prescription, to a healthcare provider computer 104 via one or more suitable network connections. For example, a purchase request may be communicated to a healthcare provider computer 104 from a customer computer via a web portal hosted by the healthcare provider computer 104. In addition, a physician/clinic/hospital computer can also communicate a healthcare request 205 as an electronic prescription order (e.g., an E-SCRIPT) to the healthcare provider computer 104.

The healthcare provider computer 104 may receive and process the request 205 to generate a healthcare transaction request 210, which may be in the form of a prescription claim request or an eligibility request. The generated healthcare transaction request 210 may be communicated by the healthcare provider computer 104 to the service provider computer 106. Accordingly, the healthcare transaction request 210 may be received by the service provider computer 106. According to an example embodiment of the invention, the healthcare transaction request 210 may be in accordance with a version of a National Council for Prescription Drug Programs ("NCPDP") Telecommunication Standard, although other standards may be utilized as well. As desired, the healthcare transaction request 210 may include a Banking Identification Number ("BIN") and/or Processor Control Number ("PCN") for identifying a claims processor computer, such as one of the claims processor computers 108a-n illustrated in FIG. 1, as a destination of the healthcare transaction request 210. In addition, the healthcare transaction request 210 may also include information relating to the patient, payer, prescriber, healthcare provider, and/or the prescribed drug or product. As an example, the healthcare transaction request 210 received by the service provider computer 106 may include one or more of the following information:

- Payer ID/Routing Information for each identified payer or potential payer
  - Banking Identification Number (BIN) and Processor Control Number PCN) that designates an intended destination of the healthcare transaction request 210
- Patient Information
  - Name (e.g., Patient Last Name, Patient First Name, etc.)
  - Date of Birth of Patient
  - Age of Patient
  - Gender
  - Patient Address (e.g., Street Address, Zip Code, etc.)
  - Patient Contact Information (e.g., Patient Telephone Number)
  - Patient ID or other identifier
- Insurance/Coverage Information
  - Cardholder Name (e.g., Cardholder First Name, Cardholder Last Name)
  - Cardholder ID and/or other identifier (e.g., person code)
- Provider (e.g., Prescriber, Pharmacy) Information
  - Prescriber Information
  - Primary Care Provider ID or other identifier (e.g., National Provider Identifier (NPI) code)
  - Primary Care Provider Name (e.g., Last Name, First Name)
  - Prescriber ID or other identifier (e.g., NPI code, DEA number)
  - Prescriber Name (e.g., Last Name, First Name)
  - Prescriber Contact Information (e.g., Telephone Number)
  - Pharmacy or other Healthcare Provider Information (e.g., store name, chain identifier, etc.)
  - Pharmacy or other Healthcare Provider ID (e.g., NPI code)
- Claim Information
  - Drug or product information (e.g., National Drug Code (NDC))
  - Prescription/Service Reference Number
  - Date Prescription Written
  - Quantity Dispensed
  - Number of Days Supply
  - Diagnosis/Condition
  - Pricing information for the drug or product (e.g., network price, Usual & Customary price)
- Date of Service.

The service provider computer 106 may receive the healthcare transaction request 210 from the healthcare provider computer 104, and the service provider computer 106 may process the healthcare transaction request 210. As desired, the service provider computer 106 may perform one or more pre-edits on the healthcare transaction request 210. The pre-edits may verify, add, and/or edit information included in the healthcare transaction request 210 prior to the healthcare transaction request 210 being communicated to an appropriate claims processor computer, such as a claims processor computer 108 illustrated in FIG. 1. If no rejections are triggered or generated by any pre-edits performed for the transaction 210, then the healthcare transaction request 210 and/or a copy thereof may be routed or otherwise communicated by the service provider computer 106 to an appropriate claims processor computer 108 associated with a designated payer for adjudication. According to an example embodiment, the service provider computer 106 may utilize at least a portion of the information included in the healthcare transaction request 210, such as a BIN/PCN, to determine the appropriate claims processor computer 108 to route the healthcare transaction request 210 to. The service provider computer 106 may also include a routing table, perhaps stored in memory, for determining which claims processor computer 108 to route the healthcare transaction request 210 to.

The claims processor computer 108 may receive and adjudicate or otherwise process the healthcare transaction request 210. For example, the claims processor computer 108 may determine benefits coverage for the healthcare transaction request 210 according to an adjudication process associated with eligibility, pricing, and/or utilization review. The claims processor computer 108 may transmit an adjudicated reply 215 or other response for the healthcare transaction request 210 to the service provider computer 106. The service provider computer 106 may receive the adjudicated reply 215 from the claims processor computer 108. As desired, the service provider computer 106 may perform any number of post-edits on the adjudicated reply 215. The service provider computer 106 may then route or otherwise communicate the adjudicated reply 215 or a copy thereof to the healthcare provider computer 104.

As desired, the service provider computer 106 may store information 220 associated with the healthcare transaction 210 and/or the adjudicated reply 215 in one or more suitable data storage devices, such as the databases 182 illustrated in FIG. 1. Examples of information that may be stored include, but are not limited to, information included in the healthcare transaction 210, information included in the reply 215, an indication of whether the transaction 210 has been approved or paid, financial information associated with the transaction 210 and/or processing of the transaction 210, etc. The stored information 220 may be utilized for a wide variety of reporting and/or billing purposes.

Additionally, the service provider computer 106 and/or the claims processor computer 108 may communicate information 225 associated with the healthcare transaction 210 and/or the adjudicated reply 215 to a suitable audit computer, such as the audit computer 110 illustrated in FIG. 1. In this regard, the audit computer 110 may conduct audits on any number of healthcare transactions in an attempt to identify exceptions and/or billing discrepancies.

It will be appreciated that variations of the data flow 200 illustrated in FIG. 2 may be utilized in accordance with various embodiments of the invention. The data flow 200 of FIG. 2 is provided by way of example only.

Figure 3A:
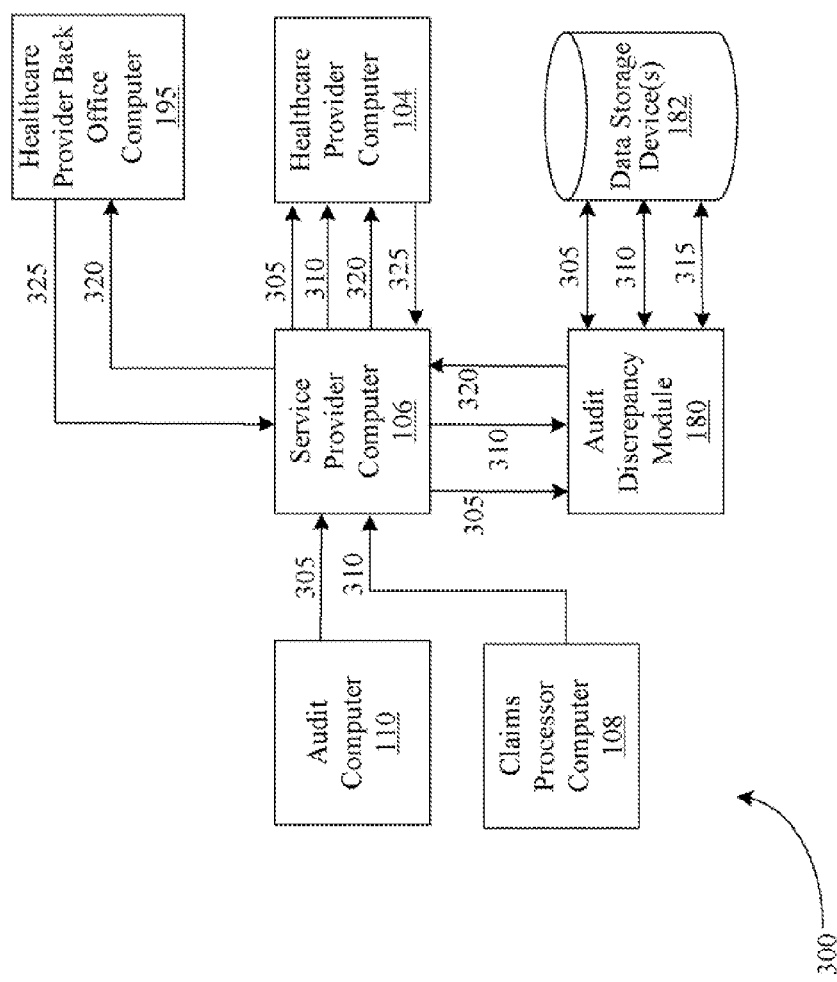
FIGS. 3A and 3B are diagrams of example data flows for processing audit information at a service provider in order to generate edits that can be utilized to process healthcare transactions, according to example embodiments of the invention.

FIG. 3A is a diagram of an example data flow 300 for processing audit information at a service provider, such as the service provider computer 106 illustrated in FIG. 1, in order to generate proposed edits that can be utilized to process subsequent healthcare transactions, according to an example embodiment of the invention. With reference to FIG. 3A, audit information, such as audit records, may be received by a service provider computer 106 from any number of suitable sources, such as the audit computer 110 and/or the claims processor computer 108 illustrated in FIG. 1. For example, a first audit record 305 may be received from the audit computer 110 and a second audit record 310 may be received from a claims processor computer 108. In certain embodiments, the received audit records 305, 310 may be associated with a healthcare provider and/or group of healthcare providers. For example, the audit records 305, 310 may be associated with healthcare transactions that originated from a healthcare provider computer, such as the healthcare provider computer 104 illustrated in FIG. 1. As desired, the service provider computer 106 may route or otherwise communicate the audit records 305, 310 to the healthcare provider computer 104 and/or to a healthcare provider back office computer, such as the back office computer 195 illustrated in FIG. 1.

Additionally, the received audit records 305, 310, copies thereof, and/or information included in the audit records 305, 310 may be communicated to an audit discrepancy module, such as the module 180 illustrated in FIG. 1, for analysis. As desired, the audit records 305, 310 may additionally be stored in one or more suitable data storage devices, such as the databases 182 illustrated in FIG. 1. The audit discrepancy module 180 may receive the audit records 305, 310 and analyze the received audit records 305, 310 in an attempt to identify one or more billing discrepancies associated with the audit records 305, 310 and their underlying healthcare transactions. As desired, the audit discrepancy module 180 may analyze the audit records 305, 310 individually, together, and/or in conjunction with other audit information and/or audit records. In certain embodiments, the audit discrepancy module 180 may access one or more rules 315 and/or parameters associated with filtering and/or sorting audit information and/or audit records for analysis.

Based upon an analysis of one or more of the audit records 305, 310, the audit discrepancy module 180 may identify a billing discrepancy, such as a reason for a charge-back and/or a request to re-bill one or more healthcare transactions. Once a billing discrepancy has been identified, the audit discrepancy module 180 may determine whether an edit should be generated to address the identified billing discrepancy and/or to mitigate an impact of the billing discrepancy with respect to subsequently processed or future healthcare transactions. In certain embodiments, the accessed rules 315 may include rules associated with the generation of proposed edits, such as threshold rules and/or threshold parameters for generating a proposed edit. As described in greater detail above with reference to FIG. 1, a wide variety of threshold parameters and/or other rules associated with the generation of an edit may be utilized as desired, such as financial and/or numerical threshold rules. If the audit discrepancy module 180 determines that an edit should be generated, then the audit discrepancy module 180 may generate a proposed edit 320 that is intended to address the identified billing discrepancy.

Once generated, the audit discrepancy module 180 may determine whether the proposed edit 320 has been approved or whether the proposed edit 320 should be automatically approved or authorized. In certain embodiments, the proposed edit 320 and/or information associated with the proposed edit 320 (e.g., financial impact information, cost savings information, impact on healthcare transaction information, etc.) may be communicated either directly or through the service provider computer 106 to the healthcare provider computer 104 and/or the healthcare provider back office computer 195 for approval. A wide variety of suitable communications techniques, for example, electronic mail, short message service ("SMS") messaging, other electronic communications, snail mail, etc., may be utilized as desired to communicate a proposed edit 320 to a recipient for approval. In response to the proposed edit 320, a message 325 indicating whether the proposed edit 320 has been approved may be received by the service provider computer 106 and/or the audit discrepancy module 180. If the message 325 indicated that the proposed edit 320 has been approved, then the audit discrepancy module 180 may instruct the service provider computer 106 to implement the proposed edit 320 in order to process subsequently received healthcare transactions.

In other embodiments, the audit discrepancy module 180 may determine whether the proposed edit 320 should be automatically approved or authorized. For example, the access rules 315 may include rules associated with the automatic authorization or approval of the proposed edit 320, such as various threshold rules for automatic approval. Based upon an analysis of the proposed edit 320 and/or the impact or potential impact of the proposed edit 320 utilizing one or more of the automatic authorization rules, the audit discrepancy module 180 may determine whether the proposed edit 320 should be approved. If the audit discrepancy module 180 determines that the proposed edit 320 should not be automatically approved, then the audit discrepancy module 180 may communicate information associated with the proposed edit 320 to the healthcare provider computer 104 and/or the healthcare provider back office computer 195 in an attempt to have the proposed edit 320 approved. If, however, the audit discrepancy module 180 determines that the proposed edit 320 should be automatically approved, then the audit discrepancy module 180 may instruct the service provider computer 106 to implement the proposed edit 320 in order to process subsequently received healthcare transactions.

Figure 3B:
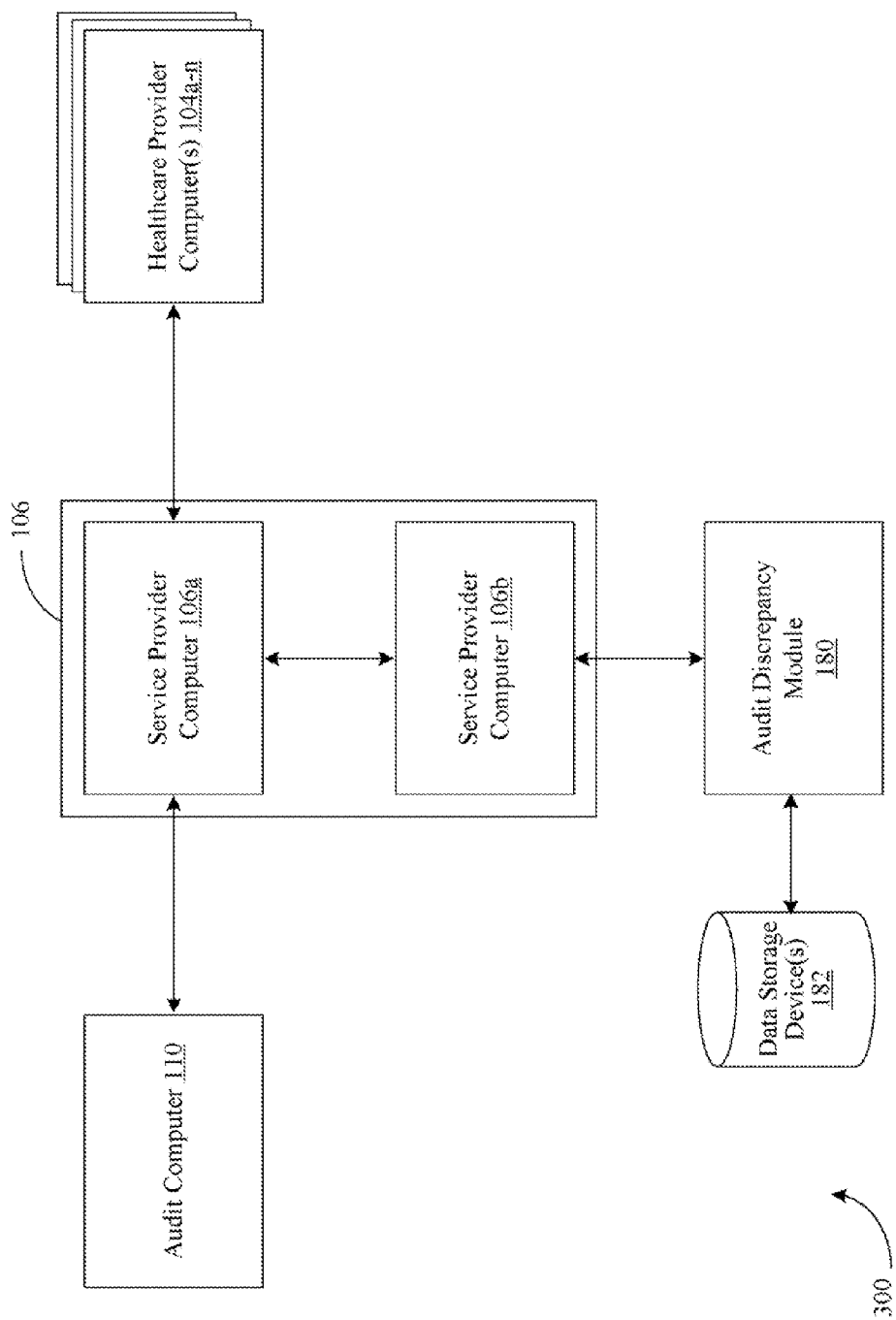

It will be appreciated that variations of the data flow 300 illustrated in FIG. 3A may be utilized in accordance with various embodiments of the invention. For example, as shown in FIG. 3B, the service provider computer 106 may be comprised of two or more distinct service provider computers 106a and 106b that are in communication with each other. Service provider computer 106a may be operative with one or more audit computers, claims processor computers, and/or healthcare provider computers, such as the audit computer 110 and healthcare provider computers 104a-n illustrated in FIG. 1. However, service provider computer 106b may have a data processing arrangement with service provider computer 106a. Under the data processing agreement, the service provider computer 106a may be permitted to utilize or offer services of the service provider computer 106b, including those of the audit discrepancy module 180. For example, a first service provider may communicate audit information and/or other information to a second service provider for processing and/or analysis in order to generate one or more proposed edits.

Figure 4:
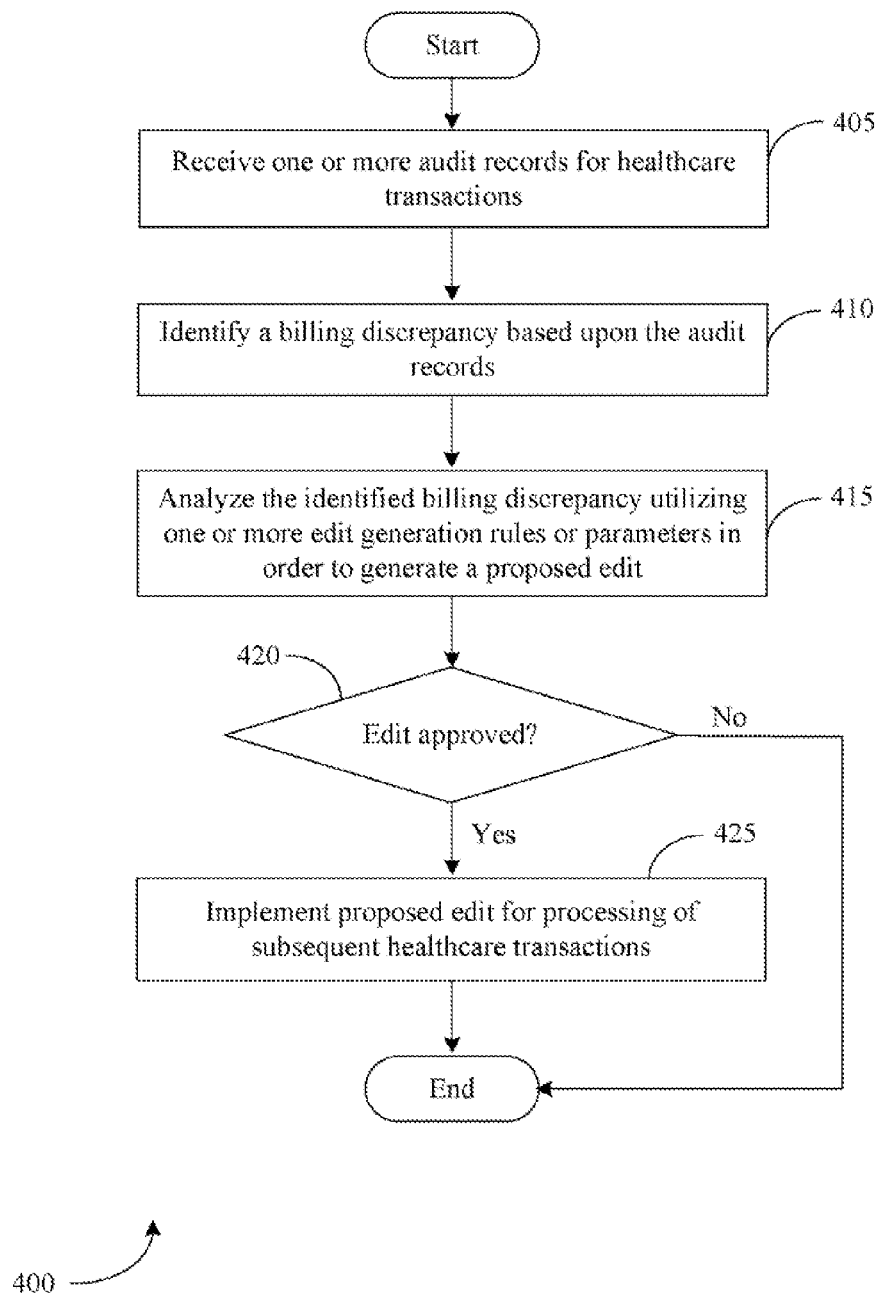
FIG. 4 is a flow diagram of an example method for processing audit information in order to generate edits that can be utilized to process healthcare transactions, according to an example embodiment of the invention.

FIG. 4 is a flow diagram of an example method 400 for processing audit information in order to generate edits that can be utilized to process healthcare transactions, according to an example embodiment of the invention. The method 400 may be performed by a suitable service provider computer and/or an associated audit discrepancy module, such as the service provider computer 106 and the audit discrepancy module 180 illustrated in FIG. 1. The method 400 may begin at block 405.

At block 405, one or more audit records and/or other audit information may be received. The received audit information may be associated with audits that have been conducted or performed on one or more healthcare transactions, such as one or more healthcare claim transactions. The audit information may be received from a wide variety of different sources as desired in various embodiments of the invention, such as one or more third-party auditing entities and/or one or more claims processors. Additionally, in certain embodiments, audits may be performed by the service provider itself. In these embodiments, the receipt of audit information may include receiving or otherwise accessing the audit information from one or more suitable data storage devices. A wide variety of information associated with a healthcare transaction may be included in an audit record, for example, an identifier of the healthcare transaction (e.g., a prescription number, etc.), an identifier of a product included in the healthcare transaction (e.g., a National Drug Code ("NDC"), a Universal Product Code ("UPC"), a Stock Keeping Unit ("SKU"), etc.), an identifier of a healthcare provider (e.g., a pharmacy identifier, store number, etc.), a date of a healthcare transaction, an exception generated by an audit, etc.

At block 410, a billing discrepancy may be identified based upon the received audit information or audit records. A billing discrepancy may be a billing error or exception that has been identified by one or more audits conducted on underlying healthcare transactions. A wide variety of billing discrepancies may be identified as desired in various embodiments of the invention, such as a reason for a charge-back or requested charge-back associated with one or more healthcare transactions, a reason for a request to re-bill one or more healthcare transactions in order to avoid a charge-back, etc. As desired, audit information and/or audit records may be sorted prior to the audit information being analyzed to identify a billing discrepancy. For example, audits associated with a particular healthcare provider or group of healthcare providers (e.g., a pharmacy chain), audits associated with a particular claims processor (e.g., a claims processor identified by a BIN), audits associated with a desired classification of products (e.g., a therapeutic classification of products), and/or audits associated with particular products or drugs (e.g., products identified by a NDC, UPC, and/or SKU) may be analyzed in order to identify a billing discrepancy.

Once a billing discrepancy has been identified, operations may continue at block 415 and the identified discrepancy may be analyzed utilizing one or more edit generation rules or parameters in order to generate a proposed edit that is intended to mitigate an impact of the identified billing discrepancy during the processing of subsequent or future healthcare transactions. Additionally, a generated proposed edit may be communicated to a healthcare provider for approval. Alternatively, a determination may be made as to whether a proposed edit should be automatically approved or authorized. One example of the operations that may be performed at block 415 to analyze an identified billing discrepancy in order to generate a proposed edit and/or to determine whether a proposed edit should be or has been approved is described in greater detail below with reference to FIG. 5.

At block 420, a determination may be made as to whether a proposed edit has been approved. For example, a determination may be made as to whether approval for a proposed edit has been received from a healthcare provider, such as an individual pharmacy, or a central office or system associated with a group of healthcare providers. As another example, a determination may be made as to whether a proposed edit has been automatically approved or authorized. If it is determined at block 420 that the proposed edit has not been approved, then operations may end. If, however, it is determined at block 420 that the proposed edit has been approved, then operations may continue at block 425.

At block 425, the proposed edit may be implemented in order to process subsequently received or future healthcare transactions. For example, the proposed edit may be implemented as an edit that is performed by a suitable PPE module, such as the PPE module 156 illustrated in FIG. 1, to process healthcare transactions and/or their replies as the transactions and/or replies are routed or otherwise communicated through the service provider computer 106. The proposed edit may include one or more rules or processing steps that are intended to identify a situation that may lead to a billing discrepancy if a processed healthcare transaction is subsequently audited. In other words, the proposed edit may include rules that are intended to identify a billing discrepancy or exception prior to the healthcare transaction being completed. In this regard, a healthcare transaction that may trigger an exception in an audit may be corrected prior to an audit being performed, thereby reducing healthcare provider costs in responding to audit demands.

The method 400 may end following either block 420 or 425.

Figure 5:
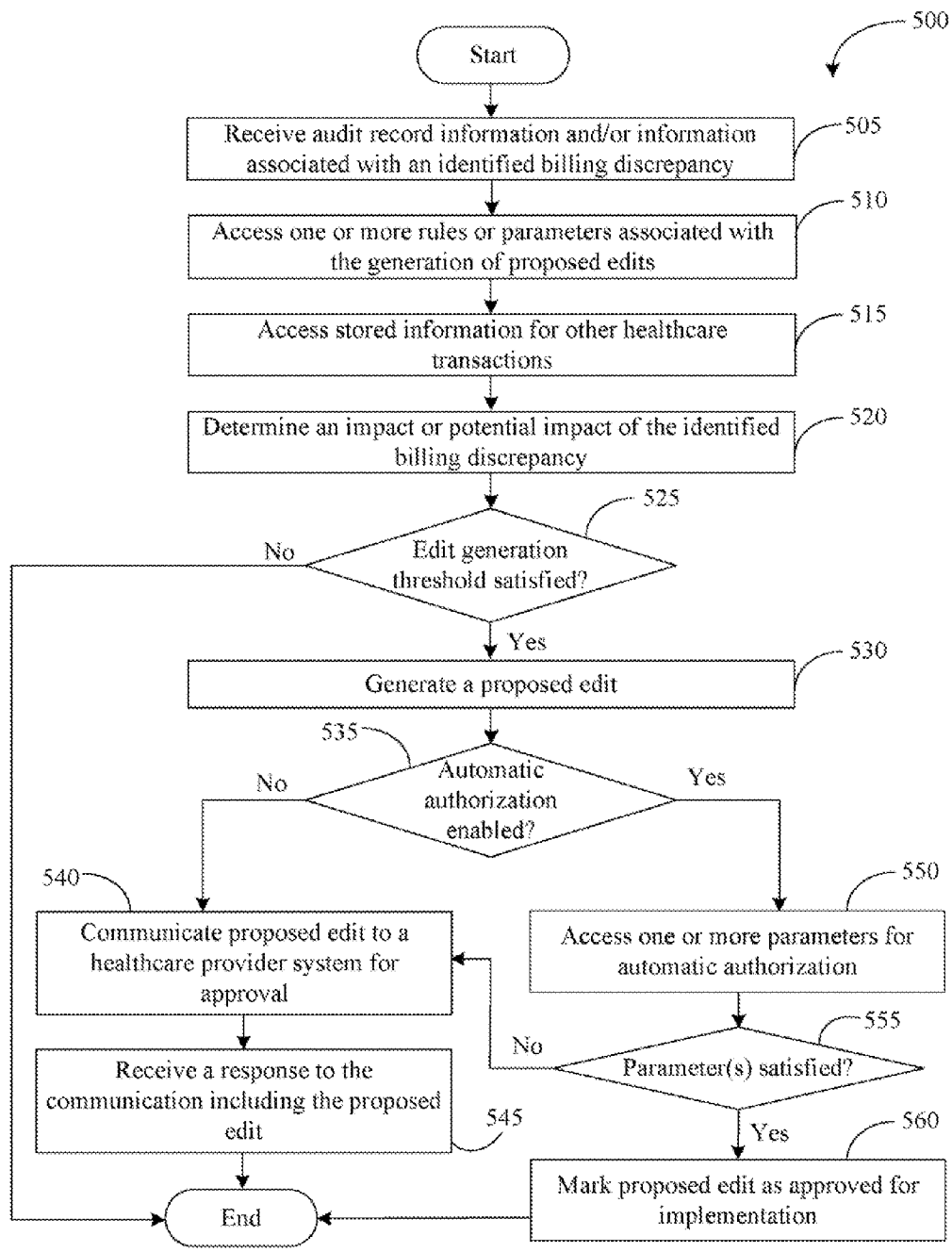
FIG. 5 is a flow diagram of an example method for generating an edit that can be utilized to process healthcare claim transactions, according to an example embodiment of the invention.

FIG. 5 is a flow diagram of an example method 500 for generating an edit that can be utilized to process healthcare claim transactions, according to an example embodiment of the invention. The method 500 illustrated in FIG. 5 may be an example implementation of block 415 shown in FIG. 4. As such, the method 500 may be performed by a suitable service provider computer and/or audit discrepancy module, such as the service provider computer 106 and/or audit discrepancy module 180 illustrated in FIG. 1. The method 500 may begin at block 505.

At block 505, audit information and/or information associated with an identified billing discrepancy may be received or identified. For example, information associated with an identified billing discrepancy and/or one or more audit records associated with the identified billing discrepancy may be received.

At block 510, one or more rules or parameters associated with the generation of proposed edits may be accessed and/or received. The rules may be associated with a healthcare provider and/or a group of healthcare providers (e.g., a pharmacy chain). As described in greater detail above with reference to FIG. 1, a wide variety of different types of rules associated with the generation of proposed edits may be utilized as desired in various embodiments of the invention. These rules include, but are not limited to, rules associated with a financial tolerance level, a financial impact, a potential financial impact, a number of healthcare transactions affected and/or potentially affected by the identified billing discrepancy and/or a percentage of healthcare transactions affected and/or potentially affected by the identified billing discrepancy. The rules may be utilized to assess a billing discrepancy in order to determine whether a proposed edit should be generated.

At block 515, which may be optional in certain embodiments of the invention, information associated with other healthcare transactions, such as healthcare transactions that have not been audited, may be accessed from memory or otherwise obtained. As desired, the information associated with other healthcare transactions may be utilized in association with the audit information at block 520 to determine a potential impact of the billing discrepancy. For example, the stored information may be analyzed in order to determine a number of healthcare transactions associated with a healthcare provider that are subject to an audit that may result in the identified billing discrepancy, a percentage of the transactions that are audited, and/or a charge-back amount or other cost associated with the identified billing discrepancy in order to extrapolate or otherwise determine a potential impact of the billing discrepancy. Additionally, at block 520, an actual impact of the identified billing discrepancy, such as a total charge-back amount, total cost, cost per healthcare transaction, etc., may be determined. A wide variety of statistical and/or data processing techniques and/or methods may be utilized as desired to determine or calculate an impact and/or potential impact of a billing discrepancy.

Once an impact or potential impact has been determined or calculated for an identified billing discrepancy, a determination may be made at block 525 as to whether an edit generation threshold has been satisfied. For example, a determined impact or potential impact may be compared to one or more impact tolerance rules. If the determined impact or potential impact exceeds a threshold impact amount, then a determination may be made that a proposed edit to address the billing discrepancy should be generated. If it is determined at block 525 that an edit generation threshold has not been satisfied, then operations may end. If, however, it is determined at block 525 that an edit generation threshold has been satisfied, then operations may continue at block 530 and at least one proposed edit that addresses the identified billing discrepancy may be generated. The generated proposed edit(s) may be designed to mitigate an impact of the identified billing discrepancy during the processing of subsequent healthcare transactions. A wide variety of proposed edits may be generated as desired in various embodiments of the invention.

At block 535, a determination may be made as to whether automatic authorization has been enabled by a healthcare provider in order to determine whether a proposed edit should be automatically approved or authorized for implementation. If it is determined at block 535 that automatic authorization has not been enabled, then operations may continue at block 540. At block 540, a message including the proposed edit may be communicated to a healthcare provider for approval. For example, a message may be communicated to a healthcare provider system, such as the healthcare provider computer 104 or the healthcare provider back office computer 195 illustrated in FIG. 1, for approval. As desired, information associated with an identified billing discrepancy, a determined or calculated impact and/or potential impact of the billing discrepancy, and/or a potential cost savings associated with implementing the proposed edit may also be communicated to the healthcare provider system. This information may assist the healthcare provider in determining whether or not the proposed edit should be approved for implementation. At block 545, a response to the communication or message including the proposed edit may be received from the healthcare provider system. The response may indicate whether or not the proposed edit has been approved for implementation.

If, however, it is determined at block 535 that automatic authorization is enabled, then operations may continue at block 550. At block 550, which may be optional in certain embodiments of the invention, one or more automatic authorization rules, parameters, and/or preferences associated with a healthcare provider or a group of healthcare providers may be accessed. These rules may be utilized to analyze the proposed edit and/or an impact or potential impact of implementing the proposed edit in order to determine whether or not the edit should be automatically approved for implementation. In certain embodiments, the automatic authorization rules may be similar to the rules described above for determining whether a proposed edit should be generated. For example, threshold rules associated with a financial impact and/or a number of affected transactions may be utilized in order to determine whether a proposed edit should be automatically authorized and implemented. As desired in certain embodiments, the various threshold values associated with automatic authorization may be approximately the same as or relatively higher than the threshold values associated with generating a proposed edit. For example, a proposed edit may be generated if a first threshold is satisfied, and the proposed edit may be automatically approved for implementation if a second threshold that is relatively higher than the first threshold is satisfied.

At block 555, a determination may be made as to whether the automatic authorization rules and/or parameters are satisfied. For example, a potential impact associated with implementing the proposed edit may be determined or calculated in a similar manner as that described above. The determined potential impact may then be compared to one or more automatic approval or automatic authorization rules in order to determine whether the proposed edit should be implemented. If it is determined at block 555 that a proposed edit is not automatically authorized, then operations may either end or, alternatively, continue at block 540 described above. If, however, it is determined at block 555 that a proposed edit is automatically authorized or approved, then operations may continue at block 560, and the proposed edit may be marked as approved for implementation. As desired, a message associated with the approval of the edit and/or the implementation of the edit may be communicated to a healthcare provider.

The method 500 may end following either block 525, 545, or 560.

The operations described and shown in the methods 400 and 500 of FIGS. 4 and 5, respectively, may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 4 and 5 may be performed.

A wide variety of proposed edits may be generated as desired in various embodiments of the invention in order to address various billing discrepancies. One example of the generation of a proposed edit will now be described with respect to a billing discrepancy associated with an over billed quantity. A healthcare provider (e.g., a pharmacy) may receive a prescription for a thirty (30) day supply of a medication, and the prescription may call for a certain quantity of the medication, such as one hundred (100) tablets or capsules of the medication, that are to be taken at regular intervals. For example, the medication may be a medication that is to be taken by a patient three times a day. When preparing a prescription claim request for the medication, a pharmacist may enter a quantity of one hundred for a thirty day supply of medication. During a subsequent audit of the transaction, an audit entity may determine that a thirty three day supply of the medication has actually been dispensed. However, because the claim only indicated a thirty day supply, a refill of the prescription may be filled early, thereby leading to a greater expense on the part of a payer. Accordingly, an exception or billing discrepancy may be generated by the audit. The exception may indicate that the pharmacy dispensed an excessive quantity or refilled a prescription too early. In an embodiment of this invention, this generated exception may be identified and utilized to generate a proposed edit that determines whether the days supply included in a healthcare transaction matches a quantity of the healthcare transaction.

Example embodiments of the invention can provide the technical effects of creating a system, method, and apparatus that analyzes audit information associated with healthcare transactions in order to generate proposed edits that address one or more billing discrepancies associated with the audit information. Additionally, example embodiments of the invention can provide the technical effect of determining an impact of an identified billing discrepancy and generating a proposed edit based upon the determined impact. In this regard, costs incurred by healthcare providers in responding to audits and/or paying charge-backs may be reduced, thereby leading to a relatively greater revenue on the part of the healthcare providers.

Various block and/or flow diagrams of systems, methods, apparatuses, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method, comprising:
receiving, by one or more computers associated with a service provider, an audit record for an audit performed on a completed healthcare transaction;
identifying, by the one or more computers and based at least in part on the audit record, a billing discrepancy for the completed healthcare transaction;
analyzing, by the one or more computers, the identified billing discrepancy utilizing one or more edit generation rules, the one or more edit generation rules comprising at least one or more rules that determine a financial impact caused by the identified billing discrepancy;
determining, by the one or more computers and based at least in part upon the one or more edit generation rules, the financial impact caused by the identified billing discrepancy, wherein the financial impact comprises at least a cost savings amount generated by a proposed edit to one or more healthcare transactions subsequently received by the one or more computers from a healthcare provider computer associated with a healthcare provider;
comparing, by the one or more computers, the determined financial impact caused by the identified billing discrepancy to a threshold impact value associated with the proposed edit;
generating, by the one or more computers and based at least in part upon the determined financial impact exceeding the threshold impact value, the proposed edit;
mitigating, by the one or more computers and based at least in part upon implementing the proposed edit on the one or more healthcare transactions subsequently received by the one or more computers from the healthcare provider computer, the financial impact of the identified billing discrepancy in the one or more healthcare transactions subsequently received by the one or more computers.

2. The method of claim 1, wherein identifying the billing discrepancy comprises identifying one of (i) a reason for a charge-back associated with the healthcare transaction or (ii) a reason associated with a request to re-bill the healthcare transaction.

3. The method of claim 1, wherein the one or more edit generation rules comprises one or more edit generation rules associated with a financial tolerance level associated with the identified billing discrepancy, a number of other healthcare transactions affected by the identified billing discrepancy, a number of other healthcare transactions potentially affected by the identified billing discrepancy, a percentage of other healthcare transactions affected by the identified billing discrepancy, or a percentage of other healthcare transactions potentially affected by the identified billing discrepancy.

4. The method of claim 1, wherein the one or more edit generation rules comprises accessing one or more rules associated with at least one of (i) a claims processor that processed the healthcare transaction, (ii) a therapeutic classification associated with a product included in the healthcare transaction, or (iii) a product included in the healthcare transaction.

5. The method of claim 1, further comprising:
communicating, by the one or more computers to a healthcare provider system, a message comprising the proposed edit and a request to implement the proposed edit on the one or more healthcare transactions subsequently received by the one or more computers;
receiving, by the one or more computers and in response to the message, an approval to implement the proposed edit; and
implementing, by the one or more computers and based upon the received approval, the proposed edit to process the one or more healthcare transactions subsequently received by the one or more computers.

6. The method of claim 5, wherein communicating a message comprises communicating a message that further includes information identifying the financial impact of implementing the proposed edit.

7. The method of claim 1, further comprising:
determining, by the one or more computers, that an automatic approval for the proposed edit has been authorized by a healthcare provider; and
implementing, by the one or more computers and based upon the automatic approval, the proposed edit to process the one or more healthcare transactions subsequently received by the one or more computers.

8. The method of claim 7, wherein determining that the automatic approval has been authorized by a healthcare provider comprises:
determining, by the one or more computers, a financial tolerance level for the healthcare provider for implementing the proposed edit;
comparing, by the one or more computers, the determined financial tolerance level to one or more automatic approval parameters for the healthcare provider; and
determining, by the one or more computers, that the automatic approval has been authorized based upon the comparison.

9. A system, comprising:
at least one memory operable to store computer-executable instructions; and
at least one processor configured to access the at least one memory and execute the computer-executable instructions to:
receive an audit record for an audit performed on a completed healthcare transaction;
identify, based at least in part on the received audit record, a billing discrepancy for the completed healthcare transaction;
analyze the identified billing discrepancy utilizing one or more edit generation rules, the one or more edit generation rules comprising at least one or more rules that determine a financial impact caused by the identified billing discrepancy;
determine the financial impact caused by the identified billing discrepancy, wherein the financial impact comprises at least an estimated cost amount caused by charge-backs or reprocessing costs of one or more healthcare transaction subsequently received from a healthcare provider computer associated with a healthcare provider;
compare the determined financial impact caused by the identified billing discrepancy to a threshold impact value associated with a proposed edit to one or more healthcare transactions subsequently received;
generate, based at least in part upon the determined financial impact exceeding the threshold impact value, the proposed edit; and
mitigate, based at least in part upon implementing the proposed edit to the one or more healthcare transactions subsequently received, the financial impact of the identified billing discrepancy in the one or more healthcare transactions subsequently received.

10. The system of claim 9, wherein the identified billing discrepancy comprises one of (i) a reason for a charge-back associated with the healthcare transaction or (ii) a reason associated with a request to re-bill the healthcare transaction.

11. The system of claim 9, wherein the one or more edit generation rules comprise one or more edit generation rules associated with a financial tolerance level associated with the identified billing discrepancy, a number of healthcare transactions affected by the identified billing discrepancy, a number of healthcare transactions potentially affected by the identified billing discrepancy, a percentage of healthcare transactions affected by the identified billing discrepancy, or a percentage of healthcare transactions potentially affected by the identified billing discrepancy.

12. The system of claim 9, wherein the one or more edit generation rules comprise one or more edit generation rules associated with at least one of (i) a claims processor that processed the healthcare transaction, (ii) a therapeutic classification associated with a product included in the healthcare transaction, or (iii) a product included in the healthcare transaction.

13. The system of claim 9, wherein the at least one processor is further configured to execute the computer-executable instructions to:

direct the communication, to a healthcare provider system, of a message comprising the proposed edit and a request to implement the proposed edit;

receive, in response to the message, an approval to implement the proposed edit; and implement, based upon the received approval, the proposed edit to process the one or more healthcare transactions subsequently received.

14. The system of claim 13, wherein the message further comprises information associated with a potential impact identifying the financial impact of implementing the proposed edit.

15. The system of claim 9, wherein the at least one processor is further configured to execute the computer-executable instructions to:

determine that an automatic approval for the proposed edit has been authorized; and implement, based upon the automatic approval, the proposed edit to process the one or more healthcare transactions subsequently received.

\* \* \* \* \*